United States Patent [19]

Shalaby et al.

[11] Patent Number: 4,543,952

[45] Date of Patent: Oct. 1, 1985

[54] FLEXIBLE COPOLYMERS OF P-(HYDROXYALKOXY)BENOZIC ACID AND PLIANT SURGICAL PRODUCTS, PARTICULARLY MONOFILAMENT SURGICAL SUTURES, THEREFROM

[75] Inventors: Shalaby W. Shalaby, Mountainville; Donald F. Koelmel, Lebanon, both of N.J.

[73] Assignee: Ethicon, Inc., Somerville, N.J.

[21] Appl. No.: 532,239

[22] Filed: Sep. 14, 1983

Related U.S. Application Data

[63] Continuation-in-part of Ser. No. 253,418, Apr. 13, 1981, abandoned.

[51] Int. Cl.[4] .................. C08G 63/66; A61L 17/00
[52] U.S. Cl. .................. 128/335.5; 128/334 C; 128/334 R; 128/326; 528/295.3; 528/302; 528/361
[58] Field of Search ............ 128/334 R, 335.5, 334 C, 128/326; 528/300, 302, 303, 304, 361, 295.3; 264/235.6, 235.8, 290.2, 290.5

[56] References Cited

U.S. PATENT DOCUMENTS

| | | | |
|---|---|---|---|
| 2,471,023 | 5/1949 | Cook et al. | 528/361 |
| 2,686,198 | 8/1954 | Bock | 560/64 |
| 2,692,248 | 10/1954 | Lincoln | 528/302 |
| 2,755,273 | 7/1956 | Bock | 528/207 |
| 3,056,761 | 10/1962 | Griehl | 528/194 |
| 3,316,296 | 4/1967 | Mihara | 526/473 |
| 3,542,737 | 11/1970 | Keck et al. | 528/302 |
| 3,651,014 | 3/1972 | Witsiepe | 528/305 |
| 3,682,863 | 8/1972 | McHale | 528/302 |
| 3,890,279 | 6/1975 | Wolfe | 528/302 |
| 3,891,604 | 6/1975 | Wolfe | 528/304 |
| 3,954,689 | 5/1976 | Hoeschele | 528/295.3 |
| 4,032,993 | 7/1977 | Coquard et al. | 528/302 |
| 4,220,753 | 9/1980 | Cerefice et al. | 528/302 |
| 4,224,946 | 9/1980 | Kaplan | 128/335.5 |
| 4,226,243 | 10/1980 | Shalaby et al. | 128/335.5 |
| 4,265,247 | 5/1981 | Lenz et al. | 128/335.5 |
| 4,388,926 | 6/1983 | Shalaby et al. | 528/304 |

FOREIGN PATENT DOCUMENTS

| | | |
|---|---|---|
| 560521 | 9/1957 | Belgium . |
| 44-20474 | 12/1969 | Japan . |
| 50-132061 | 10/1975 | Japan . |
| 968390 | 11/1961 | United Kingdom . |

OTHER PUBLICATIONS

Ishibashi—J. Polymer Science; Part A, vol. 2, pp. 4361–4366 (1964).
Mihara—Die Ang. Makromolekulare Chemie, 40/41 (1974) 41–55 (Nr. 590).
Braun et al.—Die Ang. Makromolekulare Chemie, 58/59 (1977) 227–241 (Nr. 837).
CA—72, 4277e (1970).

*Primary Examiner*—Veronica P. Hoke
*Attorney, Agent, or Firm*—Charles J. Metz

[57] ABSTRACT

Novel flexible polyesters comprising copolymers made from an alkylene oxybenzoate and one of the following sequences: (1) an alkylene, 2-alkenyl- (or alkyl-) succinate; (2) an alkylene dimerate (from the dimer of a long chain unsaturated fatty acid), and pliant surgical products, particularly monofilament surgical sutures, therefrom.

13 Claims, No Drawings

FLEXIBLE COPOLYMERS OF P-(HYDROXYALKOXY)BENOZIC ACID AND PLIANT SURGICAL PRODUCTS, PARTICULARLY MONOFILAMENT SURGICAL SUTURES, THEREFROM

This application is a continuation-in-part of our application Ser. No. 253,418, filed Apr. 13, 1981, now abandoned.

BACKGROUND OF THE INVENTION

The novel polyesters of the present invention comprise copolymers made from rigid (made from a self-condensing hydroxy acid moiety) ester units of an alkylene oxybenzoate and one of the following flexible (made from a diacid moiety and a diol) ester sequences: (1) an alkylene 2-alkenyl- (or alkyl-) succinate; or (2) an alkylene dimerate (from the dimer of a long chain unsaturated fatty acid).

Two p-(hydroxyalkoxy)benzoic acids; p-(hydroxybutoxy)benzoic acid and p-(hydroxypropoxy)benzoic acid, have been used in the production of modified poly(trimethylene terephthalate) fibers and films with improved strength and dimensional stability with no mention of a change in flexibility [Jap. Pat. Appl. No. 20474/69; Chem. Abstracts 72, 4277e (1970)]. The p-(hydroxypropoxy)benzoic acid was also used to modify poly(ethylene terephthalate) to study isomorphism in the system [J. Polym. Sci. A-2, 4361 (1964)].

The prior art does not disclose the use of AB type (i.e., self-condensing) polyesters as the precursor of crystalline hard sequences, or combining the AB oxybenzoate moieties with sequences bearing flexible chain components to produce the unique flexible copolyesters of this invention.

The homopolymer of p-(hydroxyethoxy)benzoic acid has been converted into fibers which exhibit lower crystallinity and tensile strength when compared to PET. The fibers of the homopolymer exhibit a high modulus and rigidity compared to other known monofilament sutures and seemingly preclude the use of the ethylene oxybenzoate moieties in copolymers used to produce strong but flexible fibers. [Angew. Makromol. Chem. 40/41, 41 (1974)].

U.S. Pat. Nos. 3,542,737; 3,651,014; 3,682,863; 3,890,279; and 4,388,926, as well as Angew, Makromol. Chem. 58/59, 229 (1977), disclose the use of polyether, dimerate, and 2-alkenyl succinate in the production of thermoplastic copolyester elastomers, but do not disclose their use with an AB type polyester such as the poly(alkylene oxybenzoates) of the present invention, nor do they suggest that the copolyesters of the present invention could produce the unexpectedly strong but compliant monofilaments of the present invention.

Monofilament sutures are preferred by surgeons for many surgical applications due to their inherent smoothness and noncapillarity to body fluids. Most synthetic monofilament sutures are relatively stiff. Besides making the material more difficult to handle and use, suture stiffness or low compliance can adversely affect knot tying ability and knot security.

In addition, high compliance under low stress allows the suture or other wound closure or approximation device to yield as a wound swells, so that the suture or device do not place the wound tissue under tension, which might cause tearing, cutting, or necrosis of the tissue.

The problems associated with the use of low compliance sutures in certain applications were recognized in U.S. Pat. No. 3,454,011, where it was proposed to fabricate a surgical suture composed of Spandex polyurethane. Such sutures, however, were too elastic and did not find general acceptance by the medical profession.

Recently issued U.S. Pat. No. 4,224,946 describes a monofilament suture with good flexibility and knot strength, which suture is composed of block polyetheresters which contain (1) a polymeric block of polyalkene ethers and (2) a polymeric block of aromatic dicarboxylic acids or cycloaliphatic acids with short chain aliphatic or cycloaliphatic diols. In addition, application Ser. No. 218,998 (now U.S. Pat. No. 4,388,926) discloses high compliance monofilament sutures of poly(tetramethylene terephthalate-CO-(2-alkenyl or alkyl)succinate.

It is an object of this invention to provide novel flexible polyesters which can be melt processed at moderately low temperatures to produce useful surgical sutures and allied surgical products and more particularly strong but compliant monofilament sutures having unique handling and knot tying characteristics.

SUMMARY OF THE INVENTION

The novel flexible polyesters of the present invention have rigid AB type ester units of an alkylene oxybenzoate and one of the following flexible AA-BB type ester sequences: (1) an alkylene 2-alkenyl- (or alkyl-) succinate; or (2) an alkylene dimerate (from a dimer and a long chain unsaturated fatty acid). The novel copolymers have the following formula:

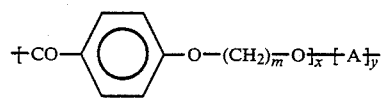

wherein m represents a number having an average value of from 2 to 6, wherein x and y represent numbers having average values such that the units represented by A comprise from about 1 to about 50 weight percent of the copolymer, the remainder comprising the alkyleneoxy benzoate units, and wherein the A units represent at least one of the following units (1) or (2):

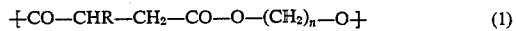  (1)

wherein n represents a number having an average value of from 2 to 12, and wherein R represents alkyl or 2-alkenyl of from 8 to 24 carbon atoms; or

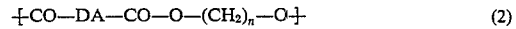  (2)

wherein DA represents the residue after removal of the carboxyl groups of dimer acid, said residue having an approximate formula of $C_{34}H_{66}$, and wherein n represents a number having an average value of 2 to 12.

The copolymers may be melt processed at low to moderate temperatures to produce useful surgical sutures and allied surgical products such as clips and staples, and more particularly, may be extruded to yield oriented fibers having the following unexpected combination of physical properties:

Knot Strength greater than about $30 \times 10^3$ psi
Tensile Strength greater than about $50 \times 10^3$ psi
Young's Modulus less than about $250 \times 10^3$ psi.

Monofilament sutures having physical properties in accordance with the present invention are particularly useful in many surgical procedures where the suture is used to close a wound which may be subject to later swelling or change in position. The low Young's modulus provides the suture with an appreciable degree of compliance under low applied force. As a result, the suture is able to "give" to accommodate swelling in the wound area. The combined low modulus and high tensile strength of the suture allows the suture to reversibly stretch during knot tie-down so that the knot "snugs down" for improved tying ability and provides knot security with a more predictable and consistent knot geometry regardless of variations in suture tying technique or tension.

The fact that copolymers of p-(hydroxyalkoxy)benzoic acid can be processed at temperatures generally below 220° C. results in less thermal degradation of the polymer in the products formed therefrom as compared with similar known thermoplastics; a distinct advantage in medical and surgical applications. In addition, the copolymers exhibit excellent melt stability at these low temperatures resulting in greater uniformity in the products formed and specifically yielding improved monofilaments having uniform diameter and physical properties.

In the preferred copolymer compositions, $m=4$, $n$ is 4 or 6, and R has a chain length of 16–24 carbon atoms. In the most preferred copolymer compositions, $m=4$, R has a chain length of 18, and the A units comprise 10–30% by weight of the copolymer.

DESCRIPTION OF THE INVENTION

The general structures of the copolymers of the invention may be expressed as follows:

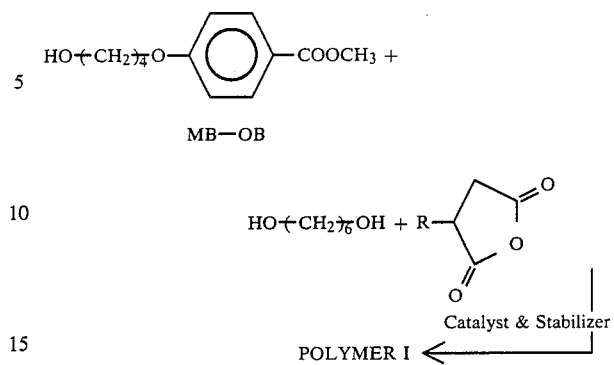

The MB—OB can be prepared according to the following typical reaction scheme:

Tetrahydrofuran + Acetyl Bromide $\xrightarrow{ZnCl_2}$

Br—(CH$_2$)$_4$—O—CO—CH$_3$
(B—A)

B—A + p-hydroxybenzoic acid $\xrightarrow{\text{Base}}$

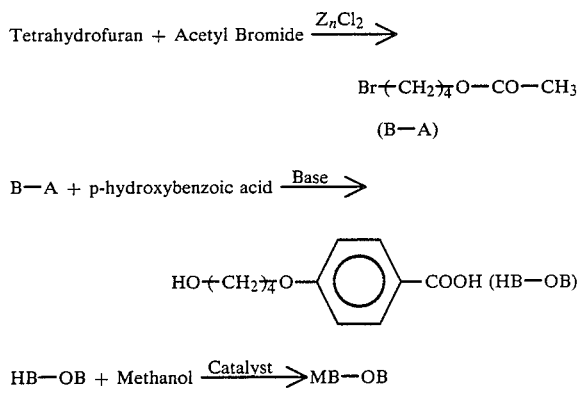

HB—OB + Methanol $\xrightarrow{\text{Catalyst}}$ MB—OB

I

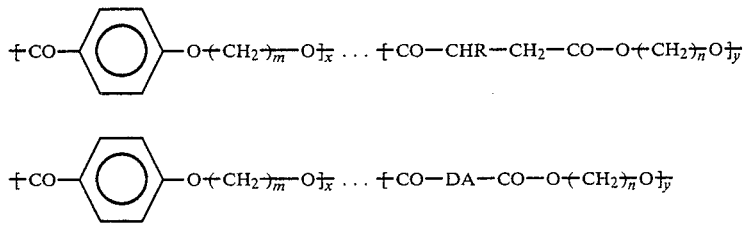

II

The structure belongs to the random copolymer type and x and y can be determined by the quantities of the starting materials used.

The term "m" in copolymers I and II is confined to 2 to 6 and preferably is 4.

The term "n" in copolymers I and II is confined to 2 to 12 and preferably is 4 or 6.

The term "R" in copolymer I may be alkyl, branched alkyl, or alkenyl (preferred 2-alkenyl) with a chain length of about 8 to 30 carbon atoms with the preferred range lying between about 16 and 24.

Copolymers of type I are prepared typically by the polycondensation of p-(4-hydroxy-n-butoxy)benzoic acid (or its methyl ester), an alkenyl- (or alkyl-) succinic anhydride (or the corresponding dialkyl succinate), and a polymethylene diol in the presence of a suitable catalyst and preferably an antioxidant. Typical illustration of the reaction can be given as follows:

Copolymers of type II are prepared typically by the polycondensation of p-(4-hydroxy-n-butoxy)benzoic acid (or its methyl ester), the dialkyl ester of dimer acid (or the free acid), and a polymethylene diol in the presence of a suitable catalyst and preferably an antioxidant.

The parent dimer acid of the diisopropyl ester utilized in the polymerization is derived by a catalyzed high pressure dimerization of high purity oleic acid.

For the two types of polymers, useful compositions for molded articles and fiber formation may contain the poly(alkylene-4-oxybenzoate) chain component at 50 to about 99% by weight. Specifically, the preferred composition that is useful for fiber formation may contain poly(n-butylene-4-oxybenzoate) moieties at about 70 to 90% by weight of the total system.

The polymers can readily be extruded at temperatures usually exceeding the polymer $T_m$ by 10°–50° C. The resulting extrudate can be drawn, usually in a two-stage process using either two consecutive heated glycerine baths or by using a hot shoe followed by a subsequent glycerine bath. Drawing may also be conducted over suitable heated rolls. The draw ratio may vary from about 300 to 700%.

The copolymers of this invention provide oriented fibers exhibiting properties that are quite unexpected in view of the prior art. Typical size 3/0 strands possessed knot strengths in the $35-40 \times 10^3$ psi range, tensile strengths in the $60-80 \times 10^3$ psi range and a Young's modulus of less than about $250 \times 10^3$ psi. Elongations ranged from 20 to 35%.

In summary, the polymers described in this patent application lend themselves to ready extrusion and drawing to strong and supple fibers which are useful as flexible monofilament sutures. A survey of fiber properties is shown in Table II.

Fibers made from polymers prepared in the presence or absence of a stabilizer upon $^{60}$Co sterilizaton (2.5 megarads) suffer minimal losses in physical properties as judged by a comparison of inherent viscosities and tensile strength before and after sterilization. The unexpected retention of physical properties followng irradiation sterilization provide a distinct advantage of these copolymers over the highly accepted polypropylene surgical sutures which undergo degradation and considerable loss in tensile properties when subjected to similar treatment. For this reason polypropylene sutures are sterilized by ethylene oxide and not by $^{60}$Co.

GENERAL POLYMERIZATION PROCEDURE

The desired amounts of monomers and a given stabilizer (optional) were placed under nitrogen into a dry reactor fitted with a mechanical stirrer, a gas inlet tube and a take-off head for distillation. The system was heated under nitrogen at 100° to 160° C. and stirring was begun. To the homogeneous stirred solution the required amount of catalyst was added. The mixture was then stirred and heated under nitrogen for given time periods at 190° C. (2-4 hours) and 220° C. (1-3 hours). The temperature was subsequently raised to 250°-260° C. and over a period of 0.4-0.7 hours the pressure was reduced in the system to below 1 mm/Hg (preferably in the range of 0.05 mm to 0.1 mm). Stirring and heating under the above conditions was continued to the completion of the polymerization. The end point was determined by either (a) estimating visually the attainment of maximum melt viscosity, (b) measuring inherent viscosity or melt indices of samples removed from the reaction vessel at intermediate time periods, and (c) using a calibrated torquemeter immersed into the reaction mixture. In practice, depending on the copolymer composition, in vacuo reaction times varied from 2 to 8 hours.

At the end of the polymerization cycle the hot mixture was equilibrated with nitrogen and allowed to cool slowly. The reaction product was isolated, cooled in liquid nitrogen, and then ground. (In the case of metal reactors the hot melt was extruded at the bottom of the vessels into Teflon covered metal trays.) The ground chips were dried at 80-110° C. for 8-16 hours under a vacuum of 1 mm or less prior to extrusion.

ANALYTICAL AND INSTRUMENTAL TESTING METHODS

Inherent viscosity ($\eta$inh) was obtained for polymer solutions in hexafluoro-2-propanol (HFIP) (dl/gm). The NMR spectra of the polymer solutions in hexafluoroacetone sesquideuterium oxide were recorded in a Jeol FX-100. A DuPont 990 DSC apparatus was used to record the melting ($T_m$) temperature of the polymers in nitrogen. A Mettler hot-stage microscope was used to determine the melting behavior of the polymers. Fiber tensile properties were measured on an Instron, Model #1122L. For the measurement of the Young's modulus, line contact jaws were applied. For tensile measurements a strain rate of 100 mm/min., was employed.

p-(4-Hydroxy-n-butoxy)benzoic acid

In a 22 liter stirred reactor, 1.16 kilograms of p-hydroxy-benzoic acid (M.W. 138) in 4 liters of water are neutralized by the addition of 0.5 liter of 40% aqueous sodium hydroxide. The temperature is adjusted to 50° C. and over a period of one hour, 1200 milliliters of 4-bromobutyl acetate are slowly added. The temperature is then raised to 90° C. + 10° C. and the hot reaction mixture kept at pH 10 by continuous titration with a 40% sodium hydroxide solution. When no change in pH is noted for a period of 45 minutes the reaction is considered complete, an additional liter of water is then added, and sufficient 40% sodium hydroxide solution to raise the pH to 11. While still hot, concentrated hydrochloric acid is added in large enough quantities to lower the pH to 1.2. The mixture is allowed to cool overnight while stirring and the precipitate collected on a filter. The precipitate is then thoroughly washed with water to remove excess acid until the wash has attained a pH of at least 5. The precipitate is then dried and dissolved in hot methanol (15% solution), and the solution filtered to remove any insolubles (usually about 6-7%). While the clear methanol solution is still hot, hot water is added to adjust the solvent ratio to 10:1 methanol/water, and set aside to let the product crystallize out overnight yielding p-(4-hydroxy-n-butoxy)benzoic acid having a melting point of 146°-148° C.

Methyl p-(4-hydroxy-n-butoxy)benzoate was obtained by refluxing a solution of p-hydroxybenzoic acid (90 grams, 0.43 mol) in methanol (540 milliliters) in the presence of concentrated sulfuric acid (32 grams) for about 4-8 hours. The reaction mixture was cooled, poured into ice water and the product was then extracted with ether. The ether extract was dried and evaporated to give a semi-solid crude ester. This was purified by crystallization from toluene and the pure ester (65% yield) melted at 52°-54° C. The infrared spectra of the pure ester were consistent with the expected structure.

GENERAL EXTRUSION PROCEDURE

Extrusion through an Instron rheometer was geared towards producing an extrudate which upon drawing (5X to 7X ratio) yielded a fiber in the 8-10 mil diameter range (size 3/0 suture). The polymers were compacted at 110°-130° C. in the extrusion chamber and extruded after a dwell time of about 9 to 15 minutes through a 40 mil die. The ram speed was about 2 centimeters/minute. Extrusion temperatures depended both on the polymer Tm and on the melt viscosity of the material at a given temperature; usually extrusion proceeded at temperatures of 10°-50° C. above the Tm. The extrudate was taken up at a speed of 18 feet per minute.

GENERAL DRAWING PROCEDURE

The extrudate (diameter range, 19-22 millimeters) was passed over take-off rollers at an input speed of four feet per minute onto a hot shoe or into a draw bath of glycerine. The temperatures of the hot shoe or draw bath varied from 50° to 100° C. The draw ratio in this first stage of operation varied from about 4X to 6X. The drawn fibers were then placed over another set of rollers into the second stage draw bath kept at temperatures ranging from about 70°–95° C. Draw ratios for the second stage operation varied from about 1.1X to 1.25X. Finally, the fiber was passed through a water wash bath and taken up on a spool.

EXAMPLES FOR POLYMER FORMATION

EXAMPLE 1:

Under a dry nitrogen atmosphere, the following materials were placed into a flame and vacuum dried 100 ml two-neck, round-bottom flask, equipped with a stainless steel paddle stirrer, a short distilling head fitted with a receiver and a gas inlet nozzle:

| | |
|---|---|
| 20.5 g. p-(4-Hydroxybutoxy)benzoic acid | (0.0976 mol) |
| 4.5 g. 2-Dodecenylsuccinic anhydride | (0.0170 mol) |
| 2.1 g. 1,6-Hexanediol | (0.0171 mol) |
| 0.271 g. 4,4'-bis($\alpha,\alpha$-Dimethylbenzyl)diphenyl amine | |
| 0.271 g. Antimony trioxide | |

After stoppering the open neck of the flask, the entire charge-containing assembly was removed from the nitrogen atmosphere and exposed to a high (less than 1 mm) vacuum for several hours. The charged reaction vessel was then vented with nitrogen, closed off, and subsequently placed in an oil bath. Under a continuous flow of nitrogen, the reaction mixture was then melted at 165° C. Once the charge was liquified, the reaction flask was connected to an efficient mechanical stirrer and thorough mixing at 165° C. was performed for 15 minutes. Still under a continuous flow of nitrogen, the melted reaction mixture was then subjected to the following heating sequence: 190° C. for 2.5 hours, 200° C. for 2.5 hours, 240° C. for 1.5 hours. As the water distillation slowed after 1.5 hours at 240° C., the receiver containing the distillate was replaced with an empty receiver. Then gradually over the course of 0.75 hours the pressure in the reaction flask was reduced to 0.05 mm. Under reduced pressure the reaction mixture was subjected to the following heating scheme: 240° C. for 2.5 hours, 255° C. for 2.5 hours, 260° C. for 1.5 hours. At the end of this heating cycle, the reaction vessel was removed from the oil bath, equilibrated with nitrogen, and then allowed to cool to room temperature. The polymer was isolated and ground after chilling in liquid nitrogen. The resulting polymer chips were dried for 8 hours at 80° C. under high vacuum (less than 1 mm). Properties of this polymer (II) and of other similarly prepared polymers are presented in Table I.

EXAMPLE 2

Under a dry nitrogen atmosphere, the following materials were placed into a flame and vacuum dried 100 ml two-neck, round-bottom flask, equipped with a stainless steel paddle stirrer, a short distilling heat fitted with a receiver and a gas inlet nozzle:

| | |
|---|---|
| 20.5 g. p-(4-Hydroxybutoxy)benzoic acid | (0.0976 mol) |
| 4.9 g. 2-Octadecenylsuccinic anhydride | (0.0139 mol) |
| 2.1 g. 1,6-Hexanediol | (0.0144 mol) |
| 0.250 g. 4,4'-bis($\alpha,\alpha$-Dimethylbenzyl)diphenyl amine | |
| 0.271 g. Antimony trioxide | |
| 0.05 g. D & C Green #6 dye | |

After stoppering the open neck of the flask, the entire charge containing assembly was removed from the nitrogen atmosphere and exposed to a high (less than 1 mm) vacuum for several hours. The charged reaction vessel was then vented with nitrogen, closed off, and subsequently placed in an oil bath. Under a continuous flow of nitrogen, the reaction mixture was then melted at 165° C. Once the charge was liquified, the reaction flask was connected to an efficient mechanical stirrer and thorough mixing at 165° C. was performed for 15 minutes. Still under a continuous flow of nitrogen, the melted reaction mixture was then subjected to the following heating sequence: 190° C. for 2.5 hours, 220° C. for 2.25 hours, 240° C. for 1.0 hours. As the water distillation slowed after 1.0 hours at 240° C., the receiver containing the distillate was replaced with an empty receiver. Then, gradually over the course of 0.75 hours the pressure in the reaction flask was reduced to 0.08 mm. Under reduced pressure the reaction mixture was subjected to the following heating scheme: 240° C. for 1.5 hours, 255° C. for 1.5 hours, 260° C. for 1.5 hours, 250° C. for 2.0 hour. At the end of this heating cycle, the reaction vessel was removed from the oil bath, equilibrated with nitrogen and then allowed to cool to room temperature. The polymer was isolated, chilled in liquid nitrogen and ground. The resulting polymer chips were dried for 8 hours at 80° C. under high vacuum (less than 1 mm). Properties of this polymer (IV) and of similarly prepared polymers are presented in Table I.

EXAMPLE 3

Under a dry nitrogen atmosphere, the following materials were placed into a flame and vacuum dried 300 ml two-neck, round-bottom flask equipped with a stainless steel paddle stirrer, a short distilling head fitting with a receiver, and a gas inlet nozzle:

| | |
|---|---|
| 91.0 g. Methyl p-(4-hydroxybutoxy)benzoate | (0.4060 mol) |
| 18.3 g. 2-Octadecenylsuccinic anhydride | (0.0521 mol) |
| 5.9 g. 1,4-Butanediol | (0.651 mol) |
| 1.0 g. 4,4'-bis($\alpha,\alpha$-Dimethylbenzyl)diphenyl amine | |
| 0.2 g. D & C Green #6 dye | |

After stoppering the open neck of the flask, the entire charge containing assembly was removed from the nitrogen atmosphere and exposed to a high (less than 1 mm) vacuum for several hours. The charged reaction vessel was then vented with nitrogen, closed off, and subsequently placed in an oil bath. Under a continuous flow of nitrogen, the reaction mixture was then melted at 100° C. Once the charge was liquified, the reaction flask was connected to an efficient mechanical stirrer and thorough mixing at 100° C. was performed for 15 minutes. Next, the catalyst (1.60 ml), consisting of a mixture of tetrabutyl orthotitanate and magnesium acetate dissolved in a mixture of methanol and butanol, was quickly syringed into the reaction vessel via the side arm. Still under a continuous flow of nitrogen, the melted reaction mixture was then subjected to the following heating sequence: 190° C. for 2.5 hours, 220° C. for 2.5 hours, 240° C. for 1.25 hours. As the water-methanol distillation slowed after 1.5 hours at 250° C., the receiver containing the distillate was replaced with an empty receiver. Then, gradually over the course of 0.75 hours the pressure in the reaction flask was reduced to 0.05 mm. Under reduced pressure the reaction mixture was subjected to the following heating scheme: 240° C. for 3.25 hours and 250° C. for 4.25 hours. At the end of this heating cycle, the reaction vessel was removed from the oil bath, equilibrated with nitrogen, and then allowed to cool to room temperature. The polymer was isolated, chilled with liquid nitrogen and ground. The resulting polymer chips were dried for 8 hours at 80° C. under high vacuum (less than 1 mm). Properties of this polymer (VIII) and other similarly prepared polymers are presented in Table I.

EXAMPLE 4

Under a dry nitrogen atmosphere, the following materials were placed into a flame and vacuum dried 100 ml two-neck, round-bottom flask equipped with a stainless steel paddle stirrer, a short distilling head fitted with a receiver, and a gas inlet nozzle:

| | |
|---|---|
| 23.2 g. p-(4-Hydroxybutoxy)benzoic acid | (0.1106 mol) |
| 3.8 g. Diisopropyl ester of dimer acid | (0.0058 mol) |
| 0.8 g. 1,6-Hexanediol | (0.0068 mol) |
| 0.2780 g. 4,4'-bis($\alpha,\alpha$-Dimethylbenzyl)diphenyl amine | |
| 0.2780 g. Antimony trioxide | |

After stoppering the open neck of the flask, the entire charge containing assembly was exposed to a high (less than 1 mm) vacuum for several hours. The charged reaction vessel was then vented with nitrogen, closed off, and subsequently placed in an oil bath. Under a continuous flow of nitrogen, the reaction mixture was then melted at 165° C. Once the charge was liquified, the reaction flask was connected to an efficient mechanical stirrer and thorough mixing at 165° C. was performed for 15 minutes. Still under a continuous flow of nitrogen, the melted reaction mixture was then subjected to the following heating sequence: 190° C. for 2.3 hours, 220° C. for 2.3 hours, 240° C. for 2.0 hours. As volative formation slowed after 2.0 hours at 240° C., the receiver containing the distillate was replaced with an empty receiver. Then, gradually over the course of 0.75 hours the pressure in the reaction flask was reduced to 0.06 mm. Under reduced pressure the reaction mixture was subjected to the following heating scheme: 240° C. for 2.25 hours, 255° C. for 2.25 hours and 260° C. for 2.0 hours. At the end of this heating cycle, the reaction vessel was removed from the oil bath, equilibrated with nitrogen, and then allowed to cool to room temperature. The polymer was isolated, nitrogen chilled and ground. The resulting polymer chips were dried for 8 hours at 80° C. under high vacuum (less than 1 mm). Properties of this polymer (X) and other similarly prepared polymers are presented in Table I.

The copolymers of the invention also may be spun as multifilament yarn and woven or knitted into fabrics or gauze, or used as prosthetic devices within the body of a human or animal where it is desirable that the structure have high tensile strength and desirable levels of compliance and/or ductility. Useful embodiments include tubes, including branched tubes, for artery, vein or intestinal repair, nerve splicing, tendon splicing, sheets for supporting damaged kidney, liver and other abdominal organs, protecting damaged surface areas such as abrasions, particularly major abrasions, or areas where the skin and underlying tissues and damaged or surgically removed.

In more detail, the medical uses of polyesters subject of this invention include, but are not necessarily limited to:

1. Solid products molded or machined
    a. orthopedic pins, clamps, screws and plates
    b. clips
    c. staples
    d. hooks, buttons, and snaps
    e. bone substitutes (e.g., mandible prosthesis)
    f. intrauterine devices
    g. draining of testing tubes or capillaries
    h. vascular implants or supports.
2. Fibrillar products, knitted, woven, and nonwoven including velours
    a. burn dressings
    b. hernia patches
    c. medicated dressings
    d. facial substitutes
    e. gauze, fabric, sheet, felt or sponge for liver hemostasis.

In combination with other components:
1. Solid products, molded or machined
    a. reinforced bone pins, needles, etc.
2. Fibrillar products
    a. arterial graft or substitutes
    b. bandages for skin surfaces
    c. burn dressings (in combination with polymeric films).

It will be understood by those skilled in the art that variations and modifications of the specific embodiments described above may be employed without departing from the spirit and scope of the invention as defined in the appended claims.

TABLE I

| | | SYNTHESIS & PHYSICAL PROPERTIES OF POLYMER TYPES I AND II | | | | | | | |
|---|---|---|---|---|---|---|---|---|---|
| Sample No. | Flexible Segment Source | Monomer Ratio Soft/Hard (moles) | % Stabilizer & Type | % D&C Green #6 (by Wt.) | Polymerization Scheme | | | Polymer $\eta$inh @ 25° C. (HFIP) | Polymer Melting Range (°C.) (by microscopy) |
| | | | | | Temp. °C. | Pres. (mm) | Time hrs. | | |
| I | — | 0/100[a] | None | 0 | 160 | N$_2$Atm. | .3 | .71 | 178–179 |
| | | | | | 190 | " | 2.5 | | |
| | | | | | 220 | " | 2.0 | | |
| | | | | | 240 | " | 1.5 | | |
| | | | | | 240 | .03 | 3.0 | | |
| | | | | | 255 | .03 | 2.0 | | |
| | | | | | 260 | .03 | 1.0 | | |
| II | Dodecenyl succinic anhydride[c] | 14.8/85.2[a] | 1% Naugard 445 | 0 | 165 | N$_2$Atm. | .3 | .70 | 132–138 |
| | | | | | 190 | " | 2.5 | | |
| | | | | | 220 | " | 3.3 | | |
| | | | | | 240 | " | 2.0 | | |
| | | | | | 240 | .05 | 2.5 | | |
| | | | | | 255 | .05 | 2.75 | | |
| | | | | | 260 | .05 | 1.5 | | |
| III | Hexadecenyl succinic | 13.2/86.8[b] | 1% Naugard 445 | 0 | 100 | N$_2$Atm. | .3 | .94 | 137–145 |
| | | | | | 190 | " | 2.5 | | |

TABLE I-continued
SYNTHESIS & PHYSICAL PROPERTIES OF POLYMER TYPES I AND II

| Sample No. | Flexible Segment Source | Monomer Ratio Soft/Hard (moles) | % Stabilizer & Type | % D&C Green #6 (by Wt.) | Polymerization Scheme Temp. °C. | Pres. (mm) | Time hrs. | Polymer $\eta$inh @ 25° C. (HFIP) | Polymer Melting Range (°C.) (by microscopy) |
|---|---|---|---|---|---|---|---|---|---|
| | anhydride[c] | | | | 220 | " | 2.5 | | |
| | | | | | 240 | " | 1.25 | | |
| | | | | | 240 | .05 | 1.75 | | |
| | | | | | 255 | .05 | 1.75 | | |
| IV | Octadecenyl succinic anhydride[c] | 12.5/87.5[a] | 1% Naugard 445 | .2 | 165 | N$_2$Atm. | .3 | .66 | 135-142 |
| | | | | | 190 | " | 2.5 | | |
| | | | | | 220 | " | 1.25 | | |
| | | | | | 240 | " | .75 | | |
| | | | | | 240 | .1 | 1.5 | | |
| | | | | | 255 | .1 | 1.5 | | |
| | | | | | 260 | .05 | 1.5 | | |
| | | | | | 250 | N$_2$Atm. | .5 | | |
| | | | | | 250 | .03 | 2.0 | | |
| V | Octadecenyl succinic anhydride[c] | 12.5/87.5[b] | 1% Naugard 445 | .2 | 165 | N$_2$Atm. | .3 | .69 | 138-144 |
| | | | | | 190 | " | 2.25 | | |
| | | | | | 220 | " | 2.25 | | |
| | | | | | 240 | " | 1.5 | | |
| | | | | | 240 | .05 | 2.0 | | |
| | | | | | 255 | .05 | 2.0 | | |
| | | | | | 260 | .05 | 2.0 | | |
| VI | Octadecenyl succinic anhydride[c] | 12.4/87.6[b] | 1% Naugard 445 | .2 | 160 | N$_2$Atm. | .3 | .91 | 138-146 |
| | | | | | 190 | " | 2.25 | | |
| | | | | | 220 | " | 2.25 | | |
| | | | | | 240 | " | 1.25 | | |
| | | | | | 240 | .08 | 2.25 | | |
| | | | | | 255 | .05 | 1.75 | | |
| | | | | | 260 | .05 | 1.25 | | |
| VII | Octadecenyl succinic anhydride[c] | 10.8/89.2[b] | 1% Naugard 445 | .2 | 165 | N$_2$Atm. | .3 | .81 | 138-144 |
| | | | | | 190 | " | 2.5 | | |
| | | | | | 222 | " | 3.0 | | |
| | | | | | 240 | .05 | 2.5 | | |
| | | | | | 240 | .05 | 2.5 | | |
| | | | | | 260 | .05 | .5 | | |
| VIII | Octadecenyl succinic anhydride[d] | 11.4/88.6[b] | 1% Naugard 445 | .2 | 100 | N$_2$Atm. | .3 | .69 | 139-144 |
| | | | | | 190 | " | 2.5 | | |
| | | | | | 220 | " | 2.5 | | |
| | | | | | 240 | " | 1.5 | | |
| | | | | | 240 | .05 | 3.25 | | |
| | | | | | 250 | .05 | 3.25 | | |
| | | | | | 240 | N$_2$Atm. | .5 | | |
| | | | | | 250 | .05 | 1.0 | | |
| IX | Diisopropyl dimerate[c] | 6.9/93.1[a] | 1% Naugard 445 | 0 | 165 | N$_2$Atm. | .3 | .74 | 154-156 |
| | | | | | 190 | " | 2.5 | | |
| | | | | | 220 | " | 2.0 | | |
| | | | | | 240 | " | 1.25 | | |
| | | | | | 240 | .04 | 2.0 | | |
| | | | | | 255 | .05 | 2.0 | | |
| X | Diisopropyl dimerate[c] | 5.0/95.0[a] | 1% Naugard 445 | 0 | 165 | N$_2$Atm. | .3 | .80 | 159-160 |
| | | | | | 190 | " | 2.3 | | |
| | | | | | 220 | " | 2.3 | | |
| | | | | | 240 | " | 2.25 | | |
| | | | | | 240 | .08 | 2.25 | | |
| | | | | | 255 | .08 | 2.25 | | |
| | | | | | 260 | .05 | 2.0 | | |
| XI | Diisopropyl dimerate[c] | 10.3/89.7[a] | 1% Naugard 445 | 0 | 165 | N$_2$Atm. | .3 | .47 | 140-144 |
| | | | | | 190 | " | 2.5 | | |
| | | | | | 220 | " | 2.5 | | |
| | | | | | 240 | " | 2.0 | | |
| | | | | | 240 | .03 | 2.5 | | |
| | | | | | 255 | .03 | 2.25 | | |
| | | | | | 260 | .03 | 2.0 | | |

[a] Hard Segment produced from para(4-hydroxybutoxy)benzoic acid.
[b] Hard segment produced from methyl-para(4-hydroxybutoxy)benzoate.
[c] Used with 1,6-hexanediol.
[d] Used with 1,4-butanediol.

TABLE II
EXTRUSION & DRAWING CONDITIONS AND ULTIMATE TENSILE PROPERTIES OF MONOFILAMENTS DERIVED FROM TYPE I AND II POLYMERS

| Poly. No. | Type | % PB Flex[a] | Polymer $\eta$inh | Polymer $T_m$[b], °C. | Extrusion Conditions °C. | $\eta$app[c] poise | Draw Conditions Ratio/Temp (°C.) First Stage | Second Stage | Diam. mil | Tensile Properties Knot psi × 10$^{-3}$ | Str psi × 10$^{-3}$ | Elong. % | Y. Mod. psi × 10$^{-3}$ |
|---|---|---|---|---|---|---|---|---|---|---|---|---|---|
| I | d | 0 | insol. | 180 | 195 | 6,984 | 5/70 | 1.05/95 | 7.9 | 55.4 | 84.9 | 15 | 641 |

TABLE II-continued
EXTRUSION & DRAWING CONDITIONS AND ULTIMATE TENSILE PROPERTIES OF MONOFILAMENTS DERIVED FROM TYPE I AND II POLYMERS

| Poly. No. | Type | % PB Flex[a] | Polymer $\eta$inh | Polymer $T_m$[b], °C. | Extrusion Conditions °C. | Extrusion Conditions $\eta$app[c] poise | Draw Conditions Ratio/Temp (°C.) First Stage | Draw Conditions Ratio/Temp (°C.) Second Stage | Diam. mil | Tensile Properties Knot psi × $10^{-3}$ | Tensile Properties Str psi × $10^{-3}$ | Tensile Properties Elong. % | Tensile Properties Y. Mod. psi × $10^{-3}$ |
|---|---|---|---|---|---|---|---|---|---|---|---|---|---|
| II | I | 25 | .70 | 132–138 | 155 | 6,070 | 5.0/55 | 1.2/80 | 8.6 | 38.2 | 54.0 | 24 | 71.4 |
| III | I | 25 | .94 | 137–145 | 200 | 8,488 | 5.0/82.2 | 1.2/70 | 8.9 | 33.3 | 70.4 | 35 | 52.0 |
| IV | I | 25 | .66 | 135–142 | 165 | 5,587 | 5.0/75 | 1.2/90 | 9.1 | 36.0 | 57.3 | 32 | 77.8 |
| V | I | 25 | .69 | 138–144 | 160 | 6,285 | 5.0/75 | 1.2/90 | 9.4 | 34.3 | 68.2 | 35 | 77.3 |
| VI | I | 25 | .91 | 138–146 | 190 | 9,401 | 5.0/75 | 1.2/90 | 9.3 | 35.2 | 65.0 | 32 | 61.1 |
| VII | I | 22 | 0.81 | 146* | 185 | 6,608 | 5.0/75 | 1.2/90 | 8.7 | 41.4 | 68.6 | 27 | 110.5 |
| VIII[e] | I | 22 | 0.69 | 142* | 180 | 4,996 | 5.5/75 | 1.09/80 | 8.9 | 37.3 | 64.3 | 29 | 96.9 |
| IX | II | 20 | 0.74 | 155–160 | 190 | 8,004 | 5/53 | 1.075/75 | 9.5 | 38.1 | 62.3 | 32 | 172 |
| X | II | 15 | 0.80 | 159–160 | 220 | 6,017 | 5.0/52 | 1.2/75 | 9.3 | 45.6 | 69.6 | 26 | 231 |
| XI | II | 28 | 0.47 | 140–145 | 155 | 3,814 | 5.0/52 | 1.2/70 | 9.1 | 26.7 | 41.5 | 35 | 52.4 |

[a] Wt. percent of flexible moieties in copolymers.
[b] By microscopy exept those with an asterisk.
[c] Apparent viscosity at a shear rate of 212.6 sec$^{-1}$.
[d] Homopolymer.
[e] All Polymers Type I were made with 1,6-hexanediol except #VIII (Made with 1,4-butanediol)

What is claimed is:

1. A surgical filament comprising a random copolymer of the formula:

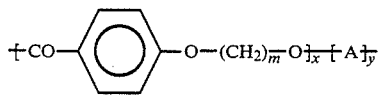

$$\text{+CO-}\underset{}{\bigcirc}\text{-O-(CH}_2)_{\overline{m}}\text{O}]_{\overline{x}}\text{-[A]}_{\overline{y}}$$

wherein m represents a number having an average value of from 2 to 6, wherein x and y represent numbers having average values such that the units represented by A comprise from about 1 to about 50 weight percent of the copolymer, the remainder comprising the alkyleneoxy benzoate units, and wherein the A units represent at least one of the following units (1) or (2):

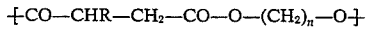

$$\text{+CO—CHR—CH}_2\text{—CO—O—(CH}_2)_n\text{—O+} \quad (1)$$

wherein n represents a number having an average value of from 2 to 12, and wherein R represents alkyl or 2-alkenyl of from 8 to 24 carbon atoms; or

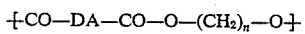

$$\text{+CO—DA—CO—O—(CH}_2)_n\text{—O+} \quad (2)$$

wherein DA represents the residue after removal of the carboxyl groups of a dimer acid of long chain unsaturated fatty acid, said residue having an approximate formula of $C_{34}H_{66}$, and wherein n represents a number having an average value of 2 to 12; wherein said filament is characterized by the following physical properties:

Knot strength greater than about $25 \times 10^3$ psi
Tensile strength greater than about $45 \times 10^3$ psi
Young's Modulus less than about $250 \times 10^3$ psi.

2. A filament as in claim 1 having a surgical needle attached to at least one end and useful as a surgical suture.

3. A filament of claim 1 or 2 in a sterile condition.

4. A filament of claim 1 wherein the A units comprise about 10–30% by weight of the copolymer.

5. A filament of claim 1 wherein m=4.

6. A filament of claim 1 wherein n=4 or 6.

7. A filament of claim 1 wherein R has a chain length of about 16–24 carbon atoms.

8. A filament of claim 1 wherein R has a chain length of about 18.

9. A filament of claim 1 wherein R is 2-alkenyl.

10. A woven or knitted surgical fabric comprised of filaments of claim 1.

11. A fabric of claim 10 in a seamless tubular construction.

12. A method of closing a wound by approximating and securing the wound tissue with a surgical fiber of claim 1.

13. A solid surgical aid molded or machined from a copolymer of the formula:

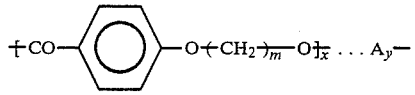

$$\text{+CO-}\underset{}{\bigcirc}\text{-O+CH}_2\overline{)_m}\text{O}]_{\overline{x}} \ldots \text{A}_y\text{-}$$

wherein m represents a number having an average value of from 2 to 6, wherein x and y represent numbers having average values such that the units represented by A comprise from a about 1 to about 50 weight percent of the copolymer, the remainder comprising the alkyleneoxy benzoate units, and wherein the A units represent at least one of the following units (1) or (2):

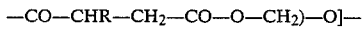

$$-\text{CO—CHR—CH}_2\text{—CO—O—CH}_2)\text{—O]—} \quad (1)$$

wherein n represents a number having an average value of from 2 to 12, and wherein R represents alkyl or 2-alkenyl of from 8 to 24 carbon atoms; or

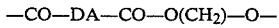

$$-\text{CO—DA—CO—O(CH}_2)\text{—O—} \quad (2)$$

wherein DA represents the residue after removal of the carboxyl groups of a dimer acid of long chain unsaturated fatty acid, said residue having an approximate formula of $C_{34}H_{66}$, and wherein n represents a number having an average value of 2 to 12.

* * * * *

UNITED STATES PATENT AND TRADEMARK OFFICE
CERTIFICATE OF CORRECTION

PATENT NO. : 4,543,952

DATED : October 1, 1985

INVENTOR(S) : Shalaby W. Shalaby and Donald F. Koelmel

It is certified that error appears in the above-identified patent and that said Letters Patent is hereby corrected as shown below:

Column 14, in the formula --Ay-- should be "y"

Column 14, line 46, after the word "from" please delete "a".

Signed and Sealed this

Twenty-second Day of April 1986

[SEAL]

Attest:

DONALD J. QUIGG

Attesting Officer

Commissioner of Patents and Trademarks